(12) United States Patent
Benway et al.

(10) Patent No.: US 6,690,320 B2
(45) Date of Patent: Feb. 10, 2004

(54) TIME DOMAIN REFLECTOMETRY MEASUREMENT INSTRUMENT

(75) Inventors: John S. Benway, Northbrook, IL (US); Donald R. Patterson, Plainfield, IL (US); James M. Berry, Deerfield, IL (US)

(73) Assignee: Magnetrol International Incorporated, Downers Grove, IL (US)

( * ) Notice: Subject to any disclaimer, the term of this patent is extended or adjusted under 35 U.S.C. 154(b) by 0 days.

(21) Appl. No.: 09/878,895

(22) Filed: Jun. 11, 2001

(65) Prior Publication Data

US 2001/0050629 A1 Dec. 13, 2001

Related U.S. Application Data

(60) Provisional application No. 60/211,363, filed on Jun. 13, 2000.

(51) Int. Cl.[7] .................. G01S 13/00; G01S 13/08; G01S 7/40
(52) U.S. Cl. .................. 342/124; 342/118; 342/165; 342/173; 342/174; 342/195; 324/332; 73/304 R
(58) Field of Search ................ 73/149, 290 R, 73/294, 304 R, 304 C, 290 B, 290 C; 342/118, 123, 124, 127, 131, 132, 134–145, 175, 195, 21, 22, 165, 173, 174; 324/332–343, 637, 642, 643–646

(56) References Cited

U.S. PATENT DOCUMENTS

| 5,457,394 A | * | 10/1995 | McEwan ................ 324/642 |
| 5,457,990 A | | 10/1995 | Oswald et al. |
| 5,610,611 A | * | 3/1997 | McEwan ................ 342/124 |
| 6,198,424 B1 | | 3/2001 | Diede et al. |
| 6,229,476 B1 | * | 5/2001 | Lutke et al. ............ 324/332 |

* cited by examiner

*Primary Examiner*—Bernarr E. Gregory
(74) *Attorney, Agent, or Firm*—Wood, Phillips, Katz, Clark & Mortimer

(57) ABSTRACT

A time domain reflectometry measuring instrument uses a microprocessor that provides added functionality and capabilities. The circuit electronics and probe are tested and calibrated at the factory. Installation and commissioning by the user is simple. The user installs the probe. The transmitter is attached to the probe. The user connects a standard shielded twisted pair to the electronics. Power is applied and the device immediately displays levels. A few simple parameters may need to be entered such as output characteristics and the process material dielectric constant.

33 Claims, 14 Drawing Sheets

TIME DOMAIN REFLECTOMETRY MEASUREMENT INSTRUMENT

CROSS-REFERENCE

This application claims priority on Serial No. 60/211,363 filed Jun. 13, 2000.

BACKGROUND OF THE INVENTION

This invention relates to an apparatus and method utilizing time domain reflectometry for measuring the condition or characteristics of a material. Knowledge of level in industrial process tanks or vessels has long been required for safe and cost-effective operation of plants. Many technologies exist for making level measurements. These include buoyancy, capacitance, ultrasonic and microwave radar, to name a few. Recent advantages in micropower impulse radar (MIR), also known as ultra-wide band (UWB) radar, in conjunction with advances in equivalent time sampling (ETS), permit development of low power and low cost time domain reflectometry (TDR) devices. Existing TDR devices are expensive and often impractical for industrial level instrumentation.

In a TDR instrument, a very fast stream of pulses with a rise time of 500 picoseconds, or less, is propagated down a transmission line that serves as a probe in a vessel. The pulses are reflected by a discontinuity caused by a transition between two media. For level measurement, that transition is typically where the air and the material to be measured meet. Alternatively, the transition could be two different liquids. The amplitude of the reflected signal depends on the difference between the dielectrics of the two media. The dielectric of air is one, while the dielectric of water is about eighty. The larger the difference in dielectric, the larger the reflected signal.

McEwan, U.S. Pat. No. 5,345,471, and other related patents, describe a technique to transmit and receive very fast pulses with simple, low cost and low power electronics. More particularly, McEwan, U.S. Pat. No. 5,609,059, describes a level sensor utilizing this technology. However, the device described therein is intended to be used for simple commercial level applications, such as automobile engine fluid levels. It does not utilize the feature set, power consumption, and versatility required for use in the industrial process environment. Other known devices utilize this technology for a two-wire transmitter using just two wires for both receiving power from the user and sending level information to the user. However, these devices are analog devices limited in the ability to measure the level of extremely low dielectric materials, or materials that coat, clump or build up on the probe, over the wide temperature extremes of industrial process level environments. They also have limited level range capability.

Guided wave radar is one of many techniques available to measure the level of liquids or solids in an industrial environment. Guided wave radar works by generating a stream of pulses of electromagnetic energy and propagating the pulses down a transmission line formed into a level sensing probe. The probe is generally placed vertically in a tank or other container and the electromagnetic pulse is launched downward from the top of the probe. The probe is open to both the air and the material to be sensed in such a way that the electromagnetic fields of the propagating pulse penetrate the air until they reach the level of the material. At that point, the electromagnetic fields see the higher dielectric of the material. This higher dielectric causes a reduction in the impedance of the transmission line, resulting in a pulse echo being reflected back to the top of the probe. The pulse travels through the air dielectric portion of the probe at a known velocity. This allows the material level on the probe to be determined by measuring the round trip travel time of the pulse from the top of the probe to the level and back to the top of the probe. Conductive materials generate echoes similar to the echoes from high dielectric materials. Therefore, the same measurement technique also works with conductive materials.

The probes are often constructed in the form of coaxial or twin conductor transmission lines. However, a probe in the form of a single conductor transmission line has a number of advantages in certain cases. An important property of the single conductor probe is that its electromagnetic fields extend much further from the probe than do the electromagnetic fields in either a coaxial or twin conductor probe. Therefore, the single conductor probe responds to the effective dielectric constant seen over a significant volume surrounding the probe. This allows the probe to respond to a material level but not respond to materials that coat the probe or stick to the probe in clumps. A second important property of a single conductor probe is that it is inherently a high impedance device compared to other transmission line types. Therefore, there is an unavoidable large impedance rise at the top of the probe where the transmission line changes from a coaxial, two-conductor, or other type of feed line to the single conductor transmission line. This impedance rise reflects a large fraction of the transmitted energy back to the receiver. Only a relatively small amount of the transmitted energy is propagated down the probe and is available for level sensing. Therefore, pulses reflected from a material level will be much smaller than the echoes from the top of probe impedance rise. Material levels sufficiently close to the top of the probe will not be sensed because the large reflected pulse from the top of the probe will overlap and obscure the smaller reflected pulse of opposite polarity from the material level.

The present invention is directed to overcoming one or more of the problems discussed above, in a novel and simple manner.

SUMMARY OF THE INVENTION

In accordance with the invention there is provided a TDR measurement instrument including improved calibration and measurement features.

Broadly, there is disclosed herein in accordance with one aspect of the invention, a time domain reflectometry measurement instrument comprising a probe defining a transmission line. A pulse circuit is connected to the probe for generating pulses on the transmission line and receiving reflected pulses returned on the transmission line, the reflected pulses representing a characteristic of a material being measured. A measuring circuit is connected to the pulse circuit for developing a representation of the reflected pulses. The measuring circuit is adapted to automatically adjust sampling responsive to variation in dielectric constant of material being traversed by the transmission line.

Further features and advantages of the invention will be readily apparent from the specification and from the drawing.

DETAILED DESCRIPTION OF THE INVENTION

Figure 1:
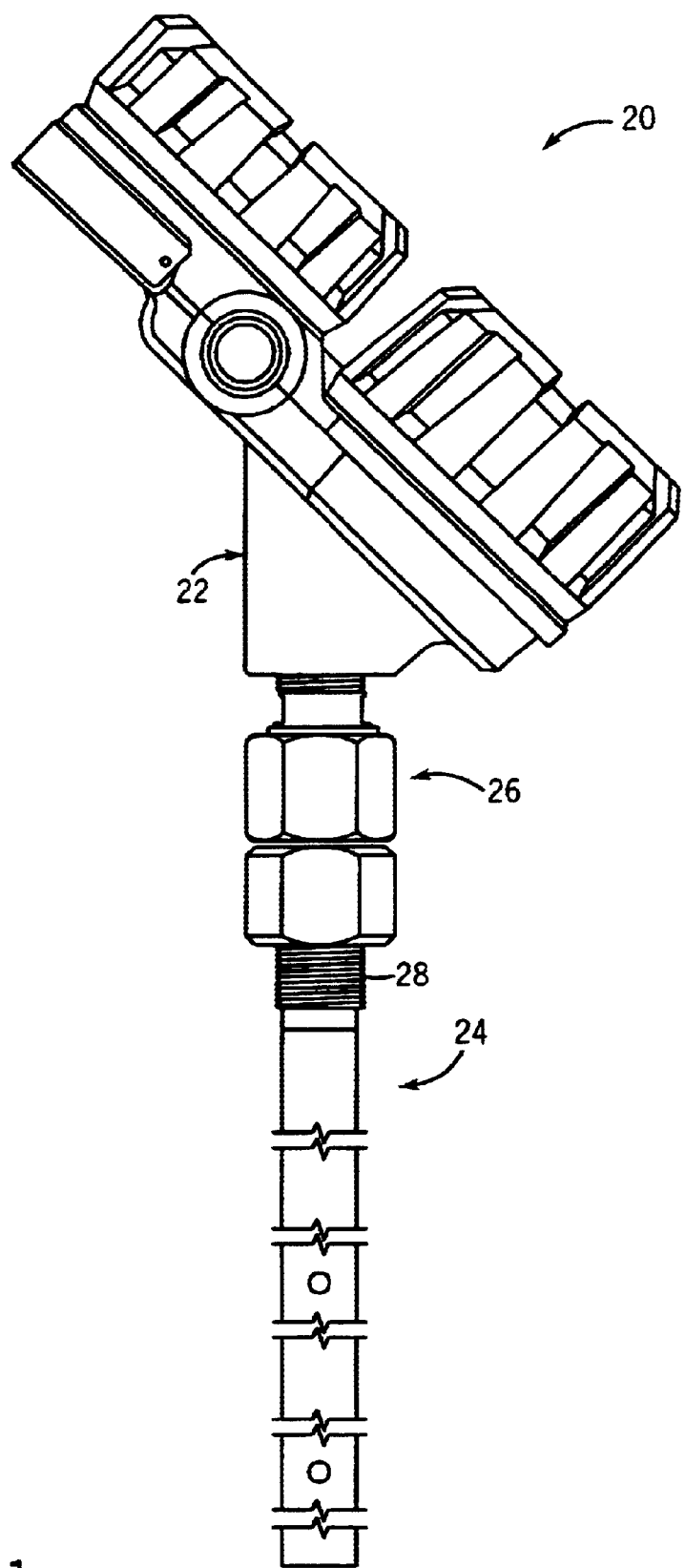
FIG. 1 is a side elevation view of a measurement instrument in accordance with the invention.

Referring to FIG. 1, a process instrument 20 according to the invention is illustrated. the process instrument 20 uses micropower impulse radar (MIR) in conjunction with equivalent time sampling (ETS) and ultra-wide band (UWB) transceivers for measuring level. Particularly, the instrument 20 uses guided wave radar for sensing level. While the embodiment described herein relates to an MIR level sensing apparatus, various aspects of the invention may be used with other types of process instruments for measuring various process parameters.

The process instrument 20 includes a control housing 22, a probe 24, and a connector 26 for connecting the probe 24 to the housing 22. The probe 24 is typically mounted to a process vessel (not shown) using a threaded fitting 28. Alternatively, a flange may be used. The housing 22 is then secured to the probe 24 as by threading the connector 26 to the probe 24 and also to the housing 22. These components may be as generally described in Mulrooney et al., U.S. patent application Ser. No. 09/094,142, filed Jun. 9, 1998, now U.S. Pat. No. 6,062,095 the specification of which is hereby incorporated by reference herein. As described therein, the probe 24 comprises a high frequency transmission line which, when placed in a fluid, can be used to measure level of the fluid. Particularly, the probe 24 is controlled by electronics in the housing 22 for determining level in the vessel.

Figure 2:
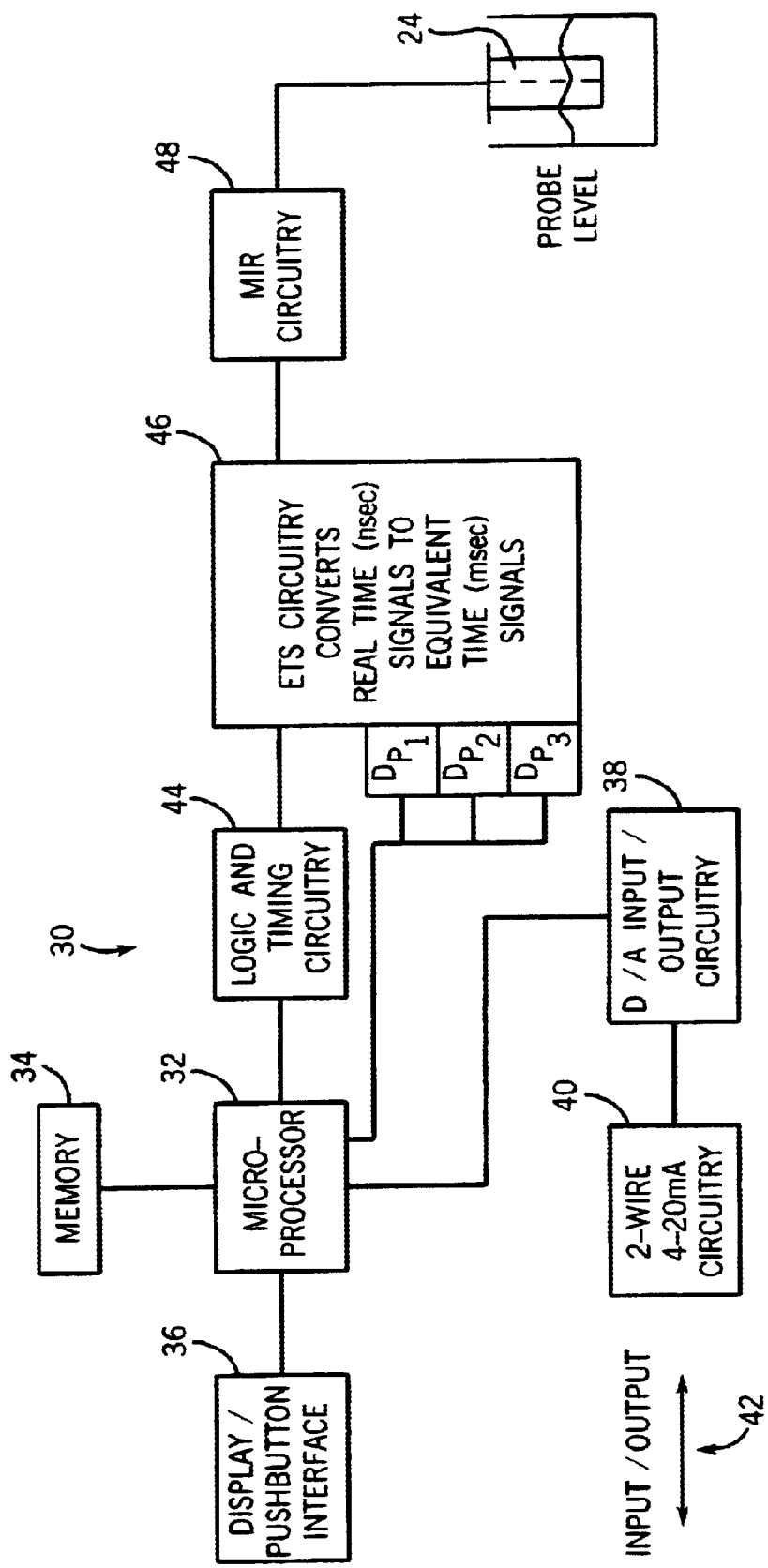
FIG. 2 is a block diagram of a control circuit for the instrument of FIG. 1.

Referring to FIG. 2, the electronics mounted in the housing 22 of FIG. 1 are illustrated in block diagram form as a control circuit 30 connected to the probe 24. The control circuit 30 includes a microprocessor 32 connected to a suitable memory 34 (the combination forming a computer) and a display/pushbutton interface 36. The display/pushbutton interface 36 may be as generally described in the Mulrooney et al. application incorporated by reference herein, and is used for entering parameters with a keypad and displaying user information. The memory 34 comprises both non-volatile memory for storing programs and calibration parameters, as well as volatile memories used during level measurement, as described below.

The microprocessor 32 is also connected to digital to analog input/output circuitry 38, which is in turn connected to two-wire 4-20 mA circuitry 40 for connecting to remote devices as represented by an input/output line 42. Particularly, the two-wire circuitry 40 utilizes loop control and power circuitry which is well known and commonly used in process instrumentation. The power is provided on the line 42 from an external power supply. The circuitry 40 controls the current on the two-wire line 42 which represents level or other characteristics measured by the probe 24.

Figure 3:
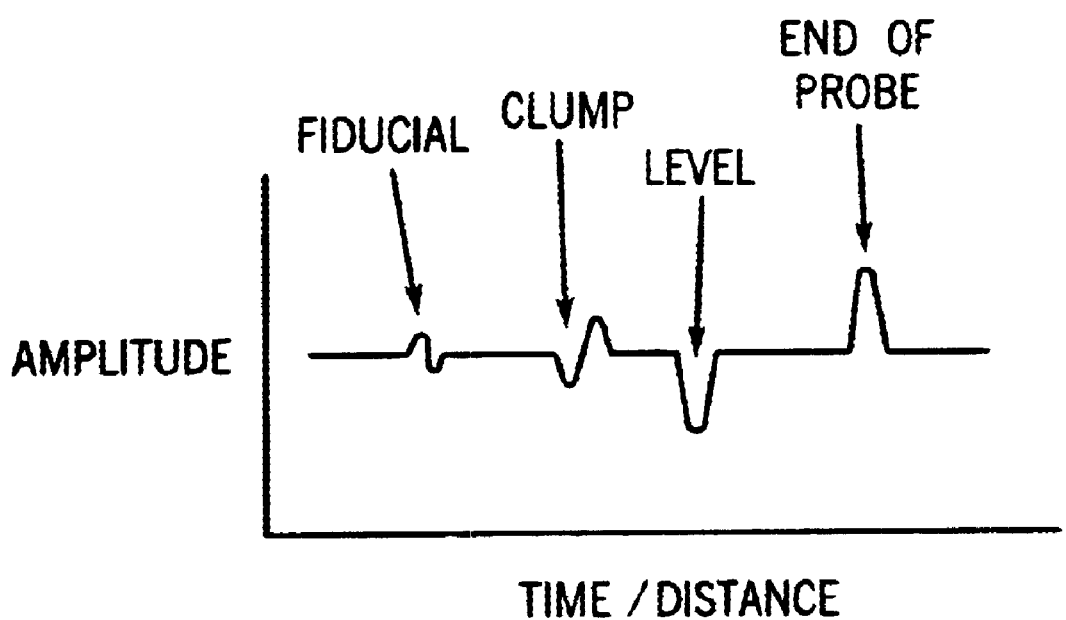
FIG. 3 is a timing diagram illustrating a return signal received by the circuit of FIG. 2.

The microprocessor 32 is also connected via logic and timing circuitry 44 to an ETS circuit 46. The logic and timing circuitry 44 converts signals to appropriate levels and coordinates timing of such signal levels. The ETS circuit 46 is connected via an MIR circuit 48 to the probe 24. The ETS circuitry 46 and the MIR circuitry 48 are known and are generally in accordance with the teachings of McEwan, U.S. Pat. Nos. 5,345,471 and 5,609,059, the specifications of which are hereby incorporated by reference herein. The MIR circuitry 48 generates hundreds of thousands of very fast pulses of 500 picoseconds or less rise time every second. The timing between pulses is tightly controlled. The reflected pulses are sampled at controlled intervals. The samples build a time multiplied "picture" of the reflected pulses. A typical picture is illustrated in FIG. 3. All of the pulses shown in FIG. 3 may not be present at the same time. A clump pulse occurs only when the material measured forms a clump on the probe. When a level pulse is present typically there is no end of probe reflection. Since the pulses travel in the probe at the speed of light, this picture represents approximately ten nanoseconds in real time for a five-foot probe. The ETS circuitry 46 converts the time to about 71 milliseconds. As is apparent, the exact time would depend on various factors, such as, for example, probe length. The largest signals have an amplitude of the order of 20 millivolts before amplification to the desired amplitude by common audio amplifiers. For a low power device, a threshold scheme is employed to give timed interrupts to the microprocessor 32 for each of the signals, namely, fiducial, clump, level, and end of probe, see FIG. 3. The microprocessor 32 converts these timed interrupts into distance. With the probe length entered through the display/pushbutton interface 36, or some other interface, the microprocessor 32 can calculate the level by subtracting from the probe length the difference between the fiducial and level distances.

In accordance with the invention, the known ETS circuitry 46 is modified to include digital control by microprocessor 32 of selected circuit parameters. Here, three digital potentiometers labeled DP1, DP2 and DP3 receive digital commands, having one of 256 settings representing desired resistance, from the microprocessor 32. The commanded resistance varies operation of the ETS circuitry 46 for controlling the signal sent via the logic and timing circuitry 44 to the microprocessor 32.

Prior art level transmitters primarily utilize analog potentiometer adjustments for various probe lengths, or may have a single setting for the maximum probe length, relying on linearity of electronics to provide level measurement with a shorter probe. These approaches limit accuracy and resolution of a level measurement. They also create difficulties during field servicing of the level transmitters. If electronics must be replaced in the field, then all the calibrations and adjustments have to be made there as well, which requires more highly qualified field personnel, special test equipment, and more time to perform such procedures. In accordance with the invention, electronic zoom scaling allows the device to overcome these shortcomings. Electronic zoom scaling combines versatility, stability and universality of analog potentiometers with the capabilities of a microprocessor using the digital potentiometers DP1 to DP3. The adjustments made by the respective digital potentiometers DP1, DP2, and DP3 are range, window and gain.

Referring to FIG. 3, the curve illustrates the return signal received by the ETS circuitry 46. The MIR circuitry 48 generates and transmits a measurement pulse at some known time to the left of the amplitude axis. The returned fiducial signal is a reference signal based on a marker built into the instrument 20. Typically, the fiducial is positioned at some location along the probe, such as the top of the probe, higher than a highest level that can be sensed. This permits level measurement all the way to the top of the probe. The ETS circuitry 46 is configured to look for a return signal only in a region of interest (ROI). A window is defined as a time from when the pulse is transmitted to the beginning of the region of interest. The ETS circuitry 46 then looks for the received pulses only within the region of interest. The ETS circuitry 46 also utilizes an adjustable range. The range represents the length of the ROI beyond the end of the window to look for return signals. The first digital potentiometer DP1 is used to adjust the range. The second digital potentiometer DP2 is used to adjust the window. The range may be adjusted to include the fiducial signal and the end of probe signal.

The third potentiometer DP3 is used for the gain adjustment. The gain adjustment controls the amplitude of the return signal. The amount of reflected energy depends on the dielectric of the material. The gain adjustment controls the amplitude of the analog signal regardless of the media.

The window and range are influenced by the tolerances of the electronic components of a given circuit board. This relationship is determined during the factory calibration of the electronics. The relevant calibration parameters are stored in an onboard memory by factory personnel. If a board has to be replaced in the field, then a new one is installed and the pertinent setup parameters are entered. No additional calibration with test equipment, potentiometer adjustments, or level measurement is necessary.

The proper combination of range and window adjustment, in accordance with the invention, allows increased resolution and accuracy of level measurements by "zooming in" on the ROI. Such ROI may be an interface between air and liquid, or an interface between air and solids, or an interface between two liquids, or any other area along the probe. The microprocessor 32 and digital potentiometers DP1–DP3 allow setting the location and size of the ROI and maintaining information about such selection with respect to the overall distance.

There is considerable interest in level measurement of materials with extremely low dielectric constants. Jet fuel and kerosene have a dielectric constant on the order of 1.7. Propane has a dielectric constant on the order of 1.4. The dielectric constant varies with temperature and with purity of the material. For these products, reflection coefficients are extremely small. By zooming in on a small ROI around the interface area, not only does the accuracy and resolution of the measurement increase, but it also allows for a lower sweep and therefore a larger number of pulses per inch. An increased number of pulses per inch increases the signal to noise ratio without increasing power consumption. Additionally, intentionally placed reference markers, or spacers, may be placed on the probe 24. This provides absolute distance references which can be used to determine material level on the probe.

Figure 4:
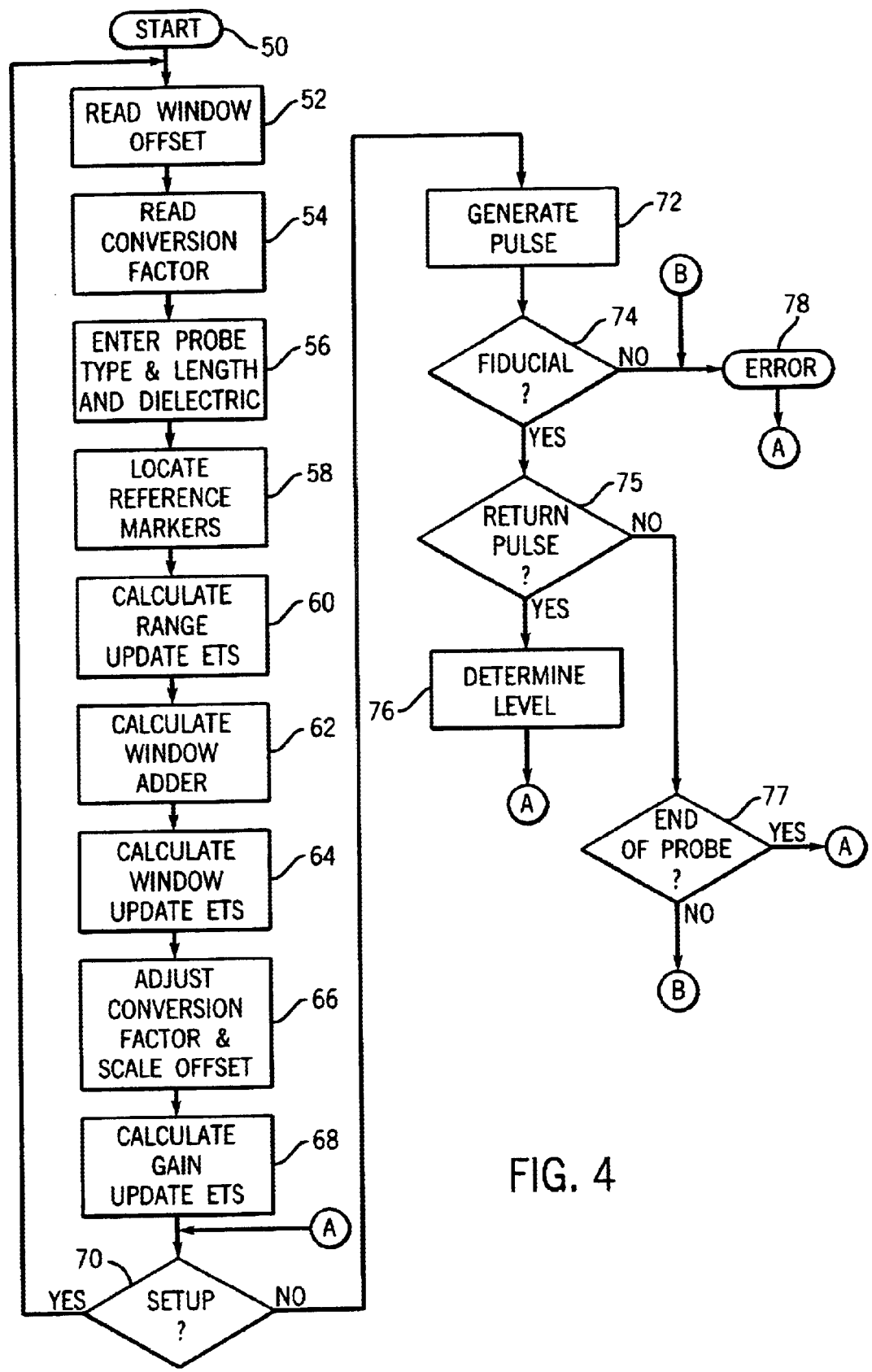
FIG. 4 is a flow diagram illustrating operation of a program by the microprocessor of FIG. 2.

Referring to FIG. 4, a flow diagram illustrates a program implemented in the microprocessor 32 of FIG. 2 for level measurement. As discussed above, the instrument 20 is factory calibrated. Particularly, the factory adjusts a parameter referred to as "window offset" so that a known marker in the probe 24, such as a fiducial, is located near the beginning of the ROI. The window offset value is stored in permanent memory for later recall. The factory then establishes a conversion factor which is a time multiplication factor representing distance per unit time, such as inches per second. The conversion factor is also stored in permanent memory. These calibrations reduce variations due to component tolerances.

Conversion factor is related to the sweep range as set by digital potentiometer DP1. A separate conversion factor is required for each setting of the digital potentiometer DP1. For simplicity, only a small number of ranges may be allowed to reduce the number of conversion factors that must be stored. For each ROI, the smallest range would be selected that allows the sweep to include at least the two reference markers of interest, such as the fiducial at the top of the probe and the end of probe. For each of the small number of allowed ranges, the conversion factor can be measured and stored as part of the factory calibration procedure.

An alternative is to allow all possible settings of DP1 to be used to select any one of a large number of possible ranges. In this case, the range that most precisely matches the ROI on the probe can be selected, improving overall resolution and accuracy. However, it becomes impractical to measure and store a conversion factor for each possible setting of DP1. Instead, a formula, for example a linear equation, is developed which relates the setting of DP1 to the conversion factor. One or two calibration constants in this formula are then measured and stored in memory during the factory calibration.

The operation of the program in the microprocessor 32 begins at a start node 50. Thereafter, the window offset value is read from memory 34 at a block 52. The conversion factor is read from the memory 34 at a block 54. Using the display/pushbutton interface 36, the user enters the probe type, probe length and dielectric of the media at a block 56. Thereafter, the program enters an automatic setup routine for controlling further operation.

At a block 58 the program uses probe type and probe length information to determine the location of markers intentionally designed into the probe to provide known reference points. As described herein, the instrument 20 uses two markers. However, the software can support any number of markers located at known points along the length of the probe 24. The first is the fiducial at the top of the probe 24. The second marker is the end of probe 24. The end of probe 24 is an open circuit which generates a very high impedance. Calibration is done with no material covering the probe. Calibration of scaling parameters such as scale offset minimizes temperature and time drift of other parameters. Calibration is also used to set up the region of interest by determining the window and range.

The software automatically adjusts range to cover the distance between the two or more markers. This is done by either formulas or lookup table using empirically determined data at a block 60. The ETS circuitry 46 is updated by writing the range value to the range digital potentiometer DP1. At a block 62, the program automatically adjusts a window adder so that the desired marker is at the beginning of the ROI. A block 64 calculates a window value. The window value is equal to the sum of the window offset, read at the block 52, and the window adder calculated at the block 62. The ETS circuitry 46 is updated by writing the window value to the window digital potentiometer DP2. The window adder is determined either by formula or look-up table.

At a block 66, the program adjusts the conversion factor and scale offset based on the value of range calculated at the block 60 and the probe information entered by the user. This is also done either by formula or lookup table. Finally, a block 68 calculates the gain based on the probe type and dielectric information entered by the user. This is done by formula or lookup table. The ETS circuitry 46 is updated by writing the gain value to the gain digital potentiometer DP3.

Thereafter, a decision block 70 determines if it is necessary to return to the setup routine. Normally, the setup routine, comprising the blocks 52–68, is implemented only if a change is made by a user entering parameters using the display/pushbutton interface 36 at the block 56. Otherwise, the program remains in the level measurement routine.

The level measurement routine begins at a block 72, where a pulse is generated. As is apparent, the generation of the pulse actually consists of a repetitive pulse sequence using the ETS and MIR technologies. A decision block 74 determines if there has been a fiducial pulse, as shown in FIG. 3. If the fiducial pulse is received, decision block 75 determines if a return level pulse is received within the ROI after the fiducial. If so, then a block 76 determines level. This is done by measuring the time between the fiducial marker at the beginning of the ROI and the reflection from the media. The time is multiplied by the conversion factor and added to the scale offset to obtain the distance from the top of the probe to an interface of dissimilar materials. The level is the probe length minus the distance plus an offset, which is the distance from the end of the probe to a predetermined reference point. The routine then returns to the decision block 70. The level measurement routine is repeated unless the user has changed a parameter, in which event the setup routine is repeated.

If a return pulse is not received, as determined at the decision block 75, then a self diagnostic routine is entered. Particularly, an expected time of flight is known between the fiducial and the end of probe. If no signal is received within that time, then the instrument 20 is not operating properly. A decision block 77 determines if an end of probe signal is detected within the expected time limit. If so, then the control returns to the decision block 70 and the level measurement routine is repeated unless the user has changed a parameter, in which event the setup routine is repeated.

If the fiducial signal or, in the absence of a level pulse, the end of probe signal is missing, an error condition is indicated at a block 78. An error message is given at display interface 36 and the current on two-wire line 42 is at an error level, e.g., less than 4 mA or more than 20 mA. The control returns to block 70, as described above.

Thus, for normal operation, the instrument 20 continues to measure level as long as the fiducial signal and a return level pulse or an end of probe pulse are received during an expected time period. However, when a setup parameter is changed, then the control returns to the setup routine for adjusting the electronic zoom scaling parameters.

Figure 5:
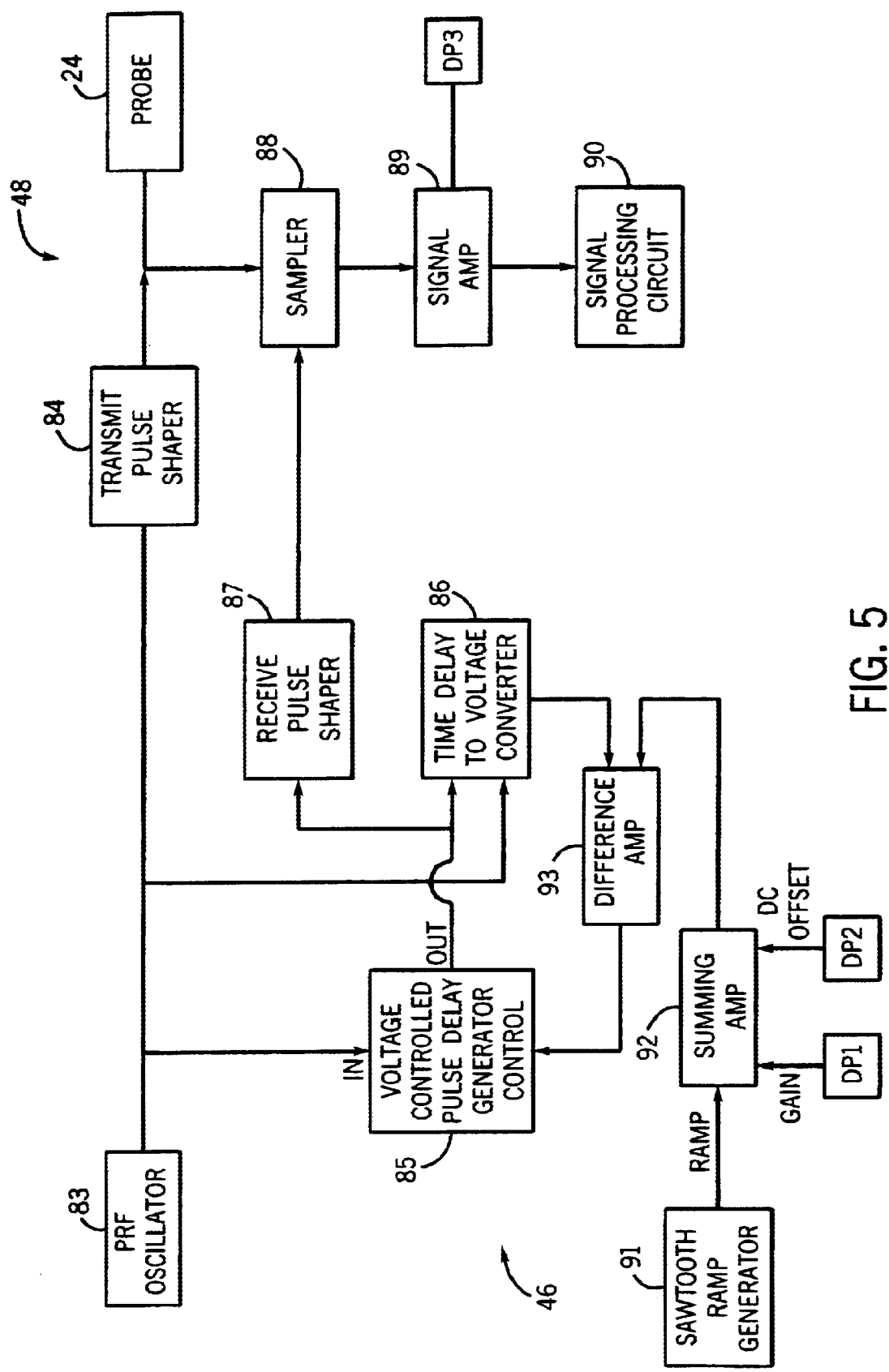
FIG. 5 is a block diagram of the ETS circuitry and MIR circuitry for the control circuit of FIG. 2.

As discussed above, the ETS circuitry 46 is modified to include the digital potentiometers DP1–DP3. Referring to FIG. 5, a block diagram illustrates the modified ETS circuitry 46 and the MIR circuitry 48 in block diagram form.

A pulse repetition frequency (PRF) oscillator 83 is connected to a transmit pulse shaper 84 which is in turn connected to the probe 24. The oscillator 83 is also connected to a pulse input of a voltage controlled pulse delay generator 85. Pulse outputs of the delay generator 85 and the oscillator 83 are also connected to a time delay to voltage converter 86. The output of the delay generator 85 is also connected to a receive pulse shaper 87 that is connected to a sampler 88. The sampler 88 is connected to the probe. An output of the sampler 88 is connected to a signal amplifier 89 which includes the gain digital potentiometer DP3. The signal amplifier 89 is in turn connected to a signal processing circuit 90 which transfers the return pulse signal to the microprocessor 32 of FIG. 2.

A sawtooth ramp generator 91 develops a sawtooth ramp as an input to a summing amplifier 92. The summing amplifier 92 is connected to the range potentiometer DP1 and the window potentiometer DP2. Range potentiometer DP1 sets gain, while Window potentiometer DP2 sets a DC offset applied to the ramp signal from the ramp generator 91. The output of the summing amplifier 92 is supplied as an input to a difference amplifier 93. The other input to the difference amplifier 93 is an output from the time delay to voltage converter 86. These input signals represent respectively a desired delay and an actual delay. The output of the difference amplifier is an error signal which is supplied to a control voltage input of the pulse delay generator 85.

The PRF oscillator 83 generates a pulse train at the frequency of the transmitted pulses. For each input pulse, the pulse delay generator 85 generates an output pulse with a delay that is controlled by its control voltage input. The delayed pulse passes through the receive pulse shaper 87 and is provided to the sampler 88. The sampler 88 samples the reflected pulses from the probe 24 at a time determined by the delayed and shaped receive pulse. The resulting low frequency sampled signal is amplified and passed on to further signal processing circuits 89 and 90. The amplifier gain is controlled by the computer controlled gain digital potentiometer DP3.

The PRF oscillator signal and the delayed pulse also are inputs to the time delay to voltage converter 86. The output of this converter 86 is a voltage proportional to the actual time delay between the transmit pulse from the PRF oscillator 83 and the receive pulse from the pulse delay generator 85. The voltage representing the measured delay is subtracted from a voltage representing the desired delay by the difference amplifier 93. The difference amplifier 93 output is an error signal that controls the time delay in the voltage controlled pulse delay generator 85. This feedback loop measures the actual pulse delay, compares it to the desired pulse delay, and forces the voltage controlled pulse delay generator 85 to adjust the actual pulse delay until it matches the desired delay. In this way, most nonlinearities and drifts in the voltage controlled pulse generator 85 have little or no effect on the actual pulse delay.

The voltage representing the desired delay is produced by the sawtooth ramp generator 91 and the summing amplifier 92. The summing amplifier amplifies the sawtooth ramp signal and adds a DC offset to the resulting signal. The DC offset voltage and the gain of the summing amplifier are controlled by the respective computer controlled digital potentiometers DP2 and DP1.

Automated control of the window (DC offset) and range (sawtooth ramp gain) using potentiometers DP1 and DP2 allows the microprocessor 32 to control the starting voltage and ending voltage of the sawtooth ramp representing the desired time delay, and therefore to control through the feedback loop the starting and ending time delay values actually applied to the sampler 88. Controlling these time delays, in turn, controls the distance down the probe 24 that the scan begins and ends, allowing the microprocessor 32 to scan any small or large portion of the probe as may be needed to easily identify a level reflection from the probe 24. All spurious signals, as reflections occurring from locations outside the scanned interval, are not seen by the signal processing circuits.

Microprocessor control of the gain potentiometer DP3 allows for adaptation to differing signal levels caused by differing dielectric constants of the reflecting medium and for differing signal amplitudes resulting from differing probe configurations.

The control circuit 30 has the capability of implementing digital communications through the two-wire circuitry 40 and line 42 with remote devices and the outside world. Such communication preferably uses the HART protocol, but could also use fieldbus protocols such as Foundation Fieldbus or Profibus PA.

Figure 6:
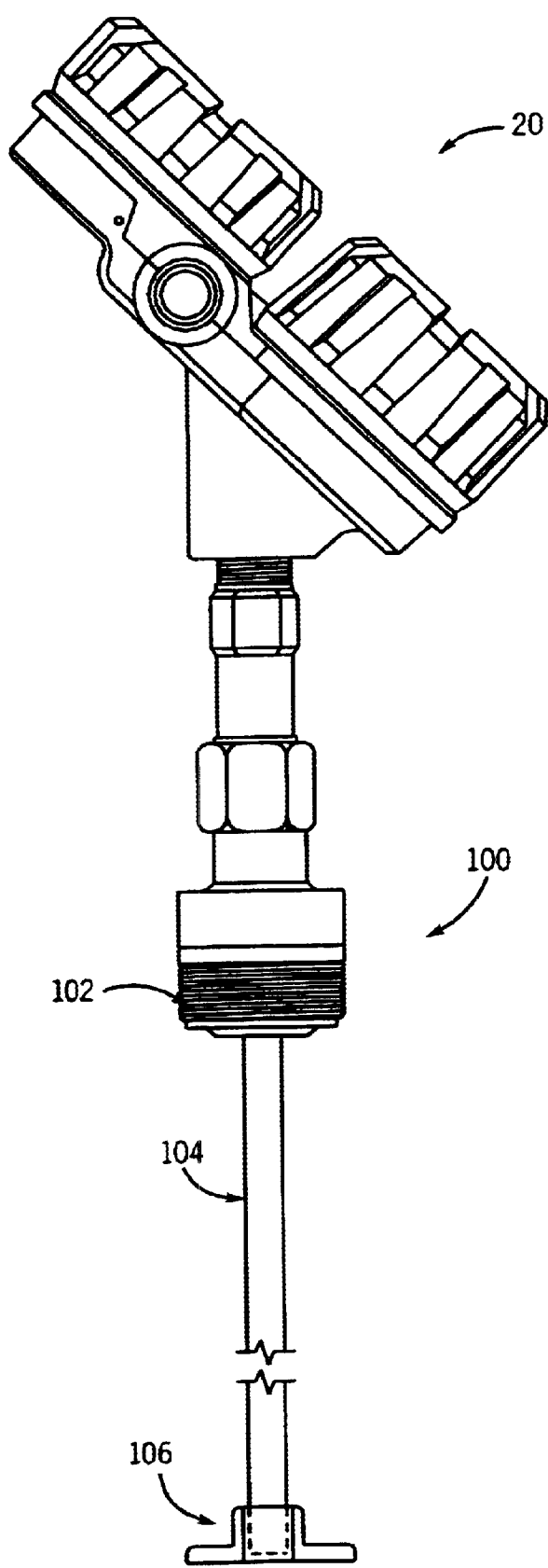
FIG. 6 is a side elevation view of the measurement instrument of FIG. 1 mounted to a single rod probe.

The probe 24 may be a coaxial probe including a signal conductor surrounded by a ground sleeve. Another type of probe is a twin rod probe. Referring to FIG. 6, the process instrument 20 is shown mounted to a single rod probe 100. The probe 100 includes a process connector 102 for mounting to a process vessel. A single rod transmission line conductor 104 extends downwardly from the process connector 102. An optional spacer 106 may be fastened to a bottom of the vessel to support the conductor 104.

Guided wave radar (GWR) and through-air radar use time domain reflectometery (TDR) techniques to measure the round trip travel time of an electromagnetic pulse from a transmitter to a material surface and back to the transmitter. The primary advantage of electromagnetic TDR techniques compared to ultrasound echo detection and timing is that the speed of propagation of an electromagnetic pulse, whether guided or propagating through air, is well known. The speed of propagation is independent of most physical parameters with the exception of the relative dielectric constant of the material being traversed. Gasses at typical atmospheric temperatures and pressures have relative dielectric constants very close to one, so that the electromagnetic pulse travels at very nearly the speed of light. Most liquid or solid materials to be sensed, however, have dielectrics large enough to produce echoes of measurable amplitudes.

If a gas layer between the transmitter of electromagnetic energy and the material to be sensed has a relative dielectric that differs significantly from one, the speed of propagation will be reduced from the speed of light by a factor equal to one over the square root of the relative dielectric constant. This velocity reduction will cause the round trip travel time of the electromagnetic pulse to increase. Unless the velocity reduction is measured and taken into account, a distance that is calculated using the speed of light in a vacuum will be too large. For example, if the distance is to be measured to an accuracy of 0.1% using the speed of light, the relative dielectric of the gas or other material between the pulse transmitter and the material to be detected must be less than 1.002. The corresponding maximum relative dielectric constants for uncorrected measurement accuracies of 1% and 5% are 1.02 and 1.10, respectively.

Gasses at increasing pressures become increasingly dense. At high enough pressures the distinction between gasses and liquids becomes blurred. Clearly, at some pressure gasses of inherently high dielectric materials will exhibit relative dielectric constants large enough to cause significant errors. For example, steam at 293 degrees F. and 60 psia has a relative dielectric constant of 1.02 and therefore will introduce a 1% error in the measured distance. Steam at 437 degrees F. and 370 psia has a relative dielectric constant of 1.10 and therefore will introduce a 5% error in the measured distance. The dielectric constant of steam and other gasses changes as the temperature, pressure, or gas composition changes.

This error can be compensated if an echo is observed from an object at a known distance from the transmitter or from a pair of markers separated by a known distance. The measured round trip travel time and the known distance can be used to calculate the speed of light in the medium and the result used to accurately convert round trip travel times of other echoes into distance. The known distance can be derived from echoes arising from any two or more markers on the probe, as discussed above, that are above the liquid level and therefore are exposed to the high-dielectric gas above the liquid level. In accordance with one aspect of the invention, the fiducial marker at the top of the probe and the end of probe signal are used as reference echoes since the length of the probe is known and the pulse polarity distinguishes the end of probe pulse from a level pulse. When the probe is dry, the transmitter software can measure the round trip travel time of the echo from the end of probe and calculate the actual speed of light in the existing application conditions. This technique could be expanded to provide partial or complete "self calibration" of the electronics in the factory, as discussed above, and in the field by measuring the round trip travel time to an echo at a known location, such as the end of probe.

Figure 7:
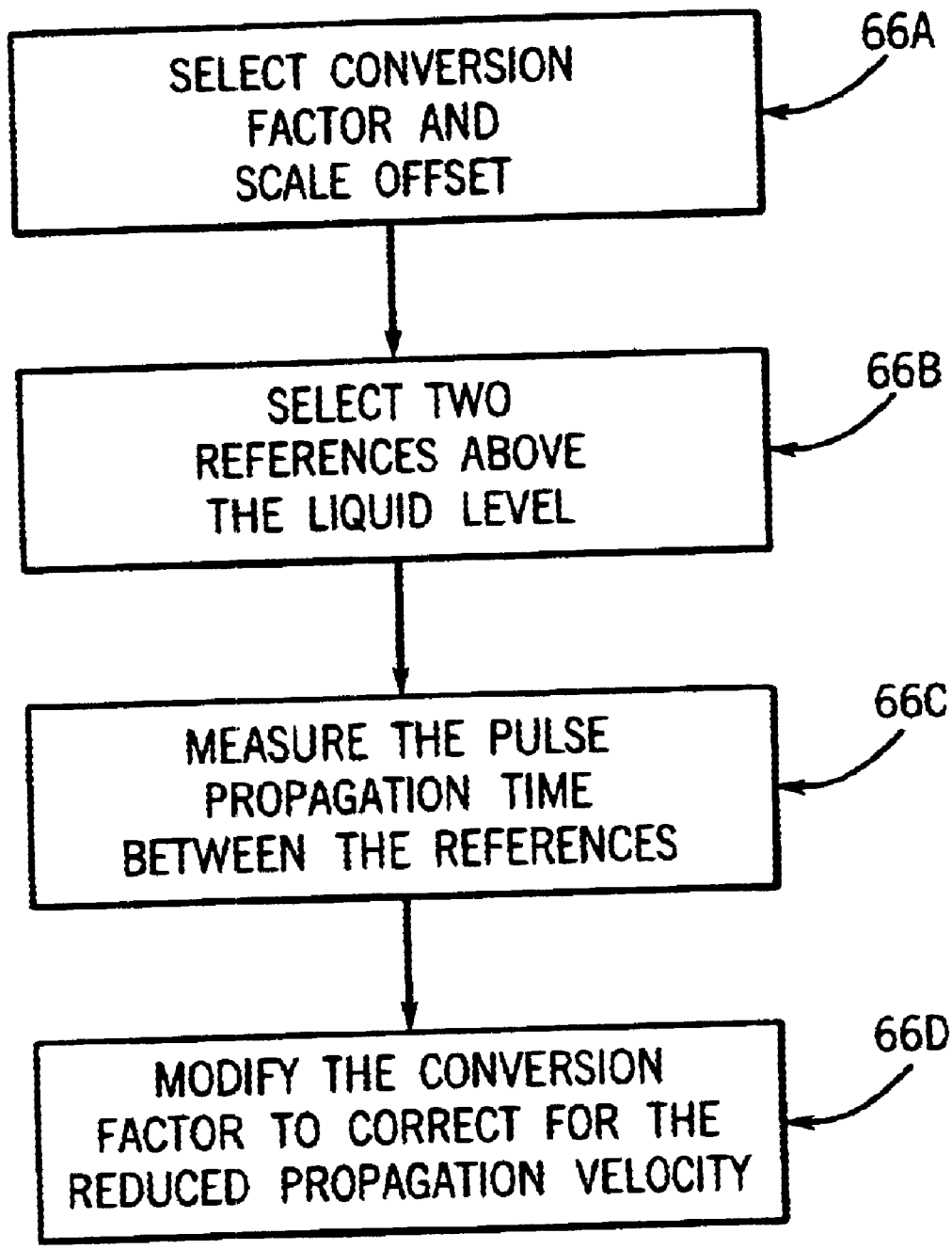
FIG. 7 is an expanded flow diagram of a conversion routine implemented in the block 66 of FIG. 4.

FIG. 7 is an expansion of block 66 of FIG. 4 for the case that automatic compensation for the dielectric constant of a gas is used. In a block 66A, the conversion factor and scale offsets are selected as in block 66 of FIG. 4. In a block 66B, two reference points above the liquid level are selected. These may be the fiducial at the top of the probe and the end of the probe, or any two markers at known locations on the probe. However, the entire distance between the two markers must be above the liquid level. When the end of the probe is used as one of the markers, the entire probe must be above the liquid level. In a block 66C, the time required for the pulse to propagate from the first marker to the second marker is measured. Finally in a block 66D, this measurement is used to modify the conversion factor obtained in the block 66A to correct for the reduced propagation velocity caused by the dielectric constant of the gas above the liquid.

The setup procedure implemented in blocks 66A through 66D can be executed at periodic intervals or whenever two markers are above the liquid level. In this way, the conversion factor can be periodically or continuously revised to track a changing propagation velocity caused by the changing dielectric constant of the gas.

Figure 8:
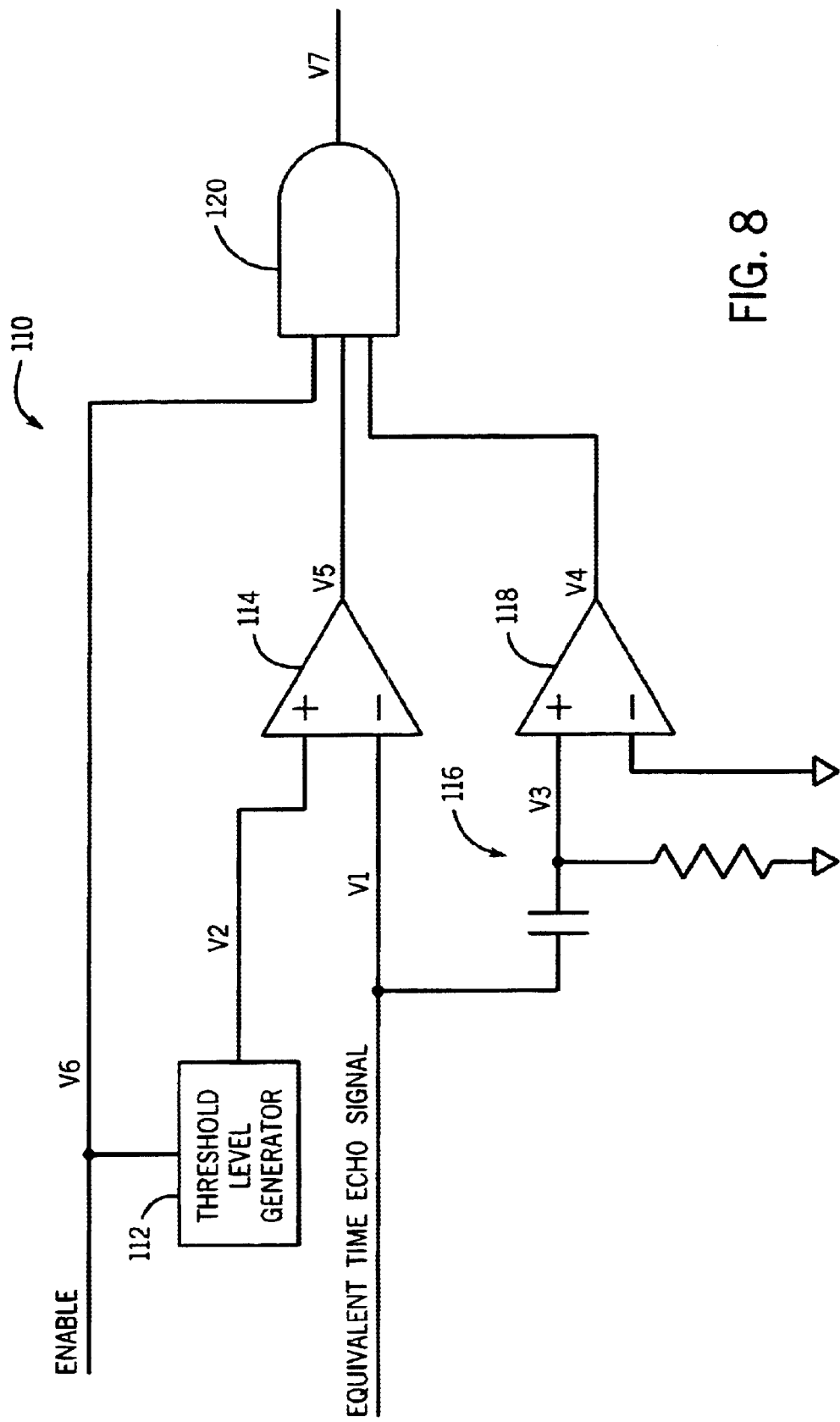
FIG. 8 is a block diagram of a pulse detection circuit in accordance with the invention.

In accordance with another aspect of the invention, the control circuit 30 includes an echo pulse detector circuit 110, see FIG. 8. The pulse detector circuit 110 may be implemented in the signal processing circuit 90 of FIG. 5.

The echo pulse detector circuit 110 consists of a threshold level generator 112, a first comparator 114, a frequency limited differentiator 116, a zero crossing detector/comparator 118, and an AND gate 120. A complex equivalent time echo signal generated as discussed above is shown as a waveform V1 in FIG. 9. The signal V1 is similar to what has been observed in an installation of a single conductor probe, such as the probe 100 of FIG. 6, in a nozzle. The first positive pulse 122 is the top of probe signal. The second large positive pulse 124 is the reflection occurring where the single conductor probe exits the nozzle. The negative pulse 126 immediately following is the multiple reflections of the transmitted pulse between the top of probe and bottom of nozzle impedance mismatches. The desired level signal is the negative going pulse 128 near the end of the waveform.

Figure 9:
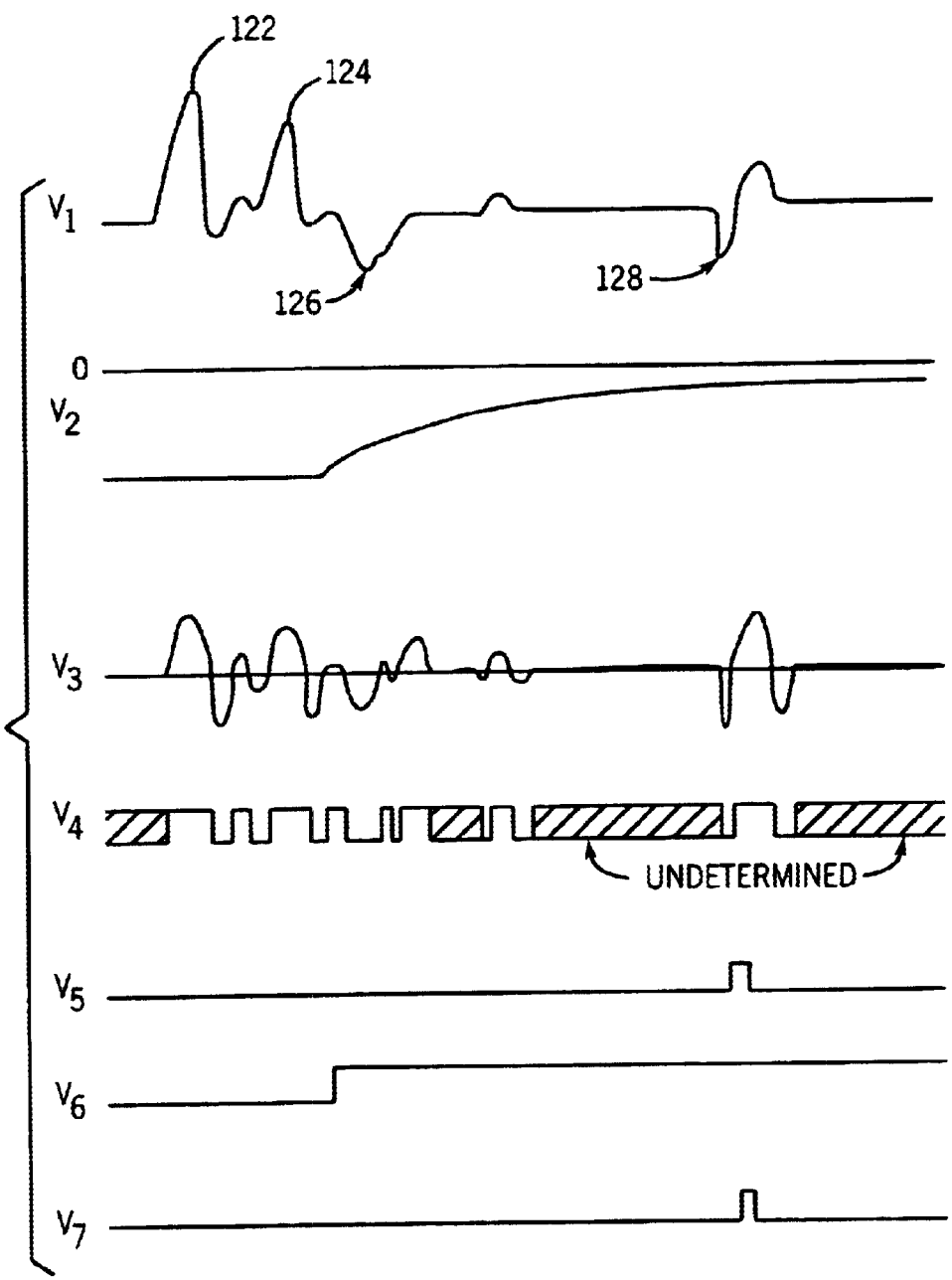
FIG. 9 is a series of waveforms illustrating operation of the circuit of FIG. 8.

The threshold level generator 112 produces an exponentially decaying voltage, see the waveform V2 of FIG. 9, that begins at a relatively large voltage and decays to a relatively small voltage. The first comparator 114 receives the echo signal V1 and the decaying voltage V2 and generates an output waveform V5 having a pulse if the amplitude of the echo signal V1 exceeds the amplitude of the threshold V2. The threshold signal V2 decays with time to approximately match the rate at which the echo signal amplitude decays with distance down the single conductor probe. Since the real time to equivalent time scaling factor depends on the probe length, the decay constant of V2 may advantageously be adjusted when the probe length is changed. This can be done by using a digitally adjustable potentiometer in parallel with a capacitor. The value of V2 is allowed to decay to a small but non-zero value so that the comparator will not trip on noise.

The equivalent time signal V1 is also differentiated by the differentiator 116 to produce a waveform V3 which is passed to the zero crossing detector 118. The output of the zero crossing detector 118, a waveform V4, is a digital representation of the sign of the derivative of the equivalent time signal V1. The differentiator 116 is intentionally frequency limited so that high frequency noise will not be amplified.

An enable signal represented by a waveform V6 is used to start the exponential decay of the threshold voltage and to enable the circuit output. The rising edge of an output signal from the AND gate 120, illustrated as a waveform V7, occurs when A) the enable signal V6 is high, B) the equivalent time signal V1 exceeds the threshold signal V2, and C) the sign of the derivative of the equivalent time signal V1 changes from negative to positive. Since the derivative changes from negative to positive when the equivalent time signal reaches its negative peak, the output V7 goes positive at the desired signal peak.

The same circuit can be used to detect both the top of probe signal for use as a fiducial and the positive end of probe signal by algebraically inverting V2 and interchanging the positive and negative inputs to the comparators 114 and 118. In this case, V6 would not be fed to the output AND gate. In practice, the first pulse 122 shown in V1 is much larger than the remaining pulses. Therefore, digitally controlled potentiometer DP3, see FIG. 5, will be adjusted by the microprocessor 32 to increase the signal gain following the first peak so that the following pulses are of sufficient amplitude to allow signal processing. Before beginning the next sweep, the microprocessor 32 will have to return DP3 to a value which produces a lower signal gain so that the first pulse does not saturate the signal processing circuits.

Figure 10:
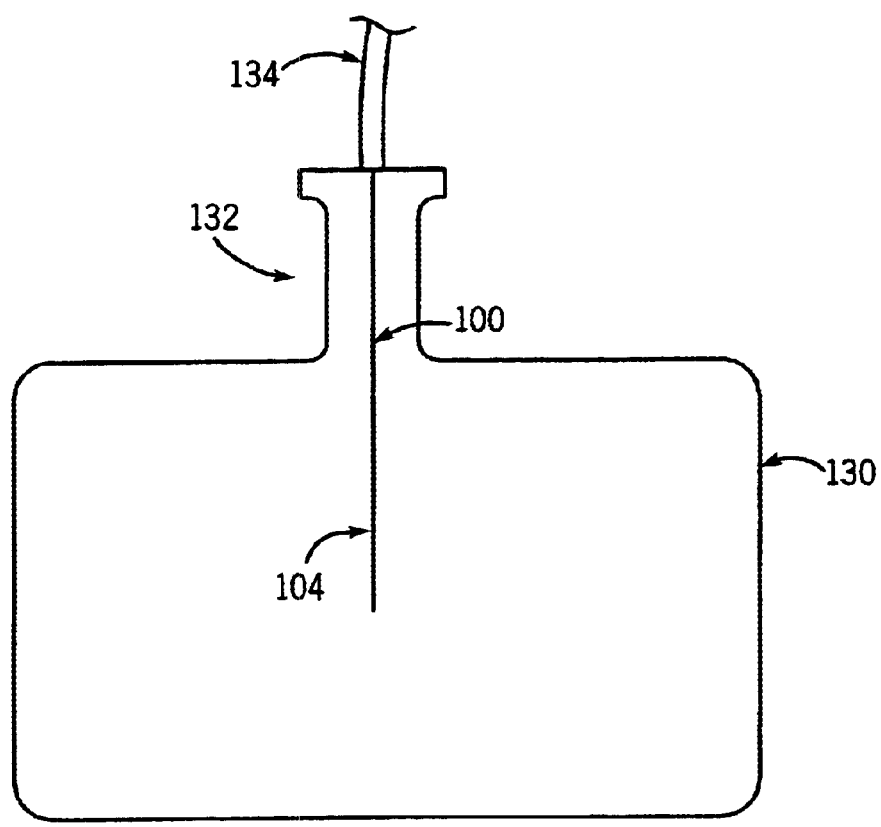
FIG. 10 is an elevation view of a single rod probe mounted in a tank nozzle.
Figure 11:
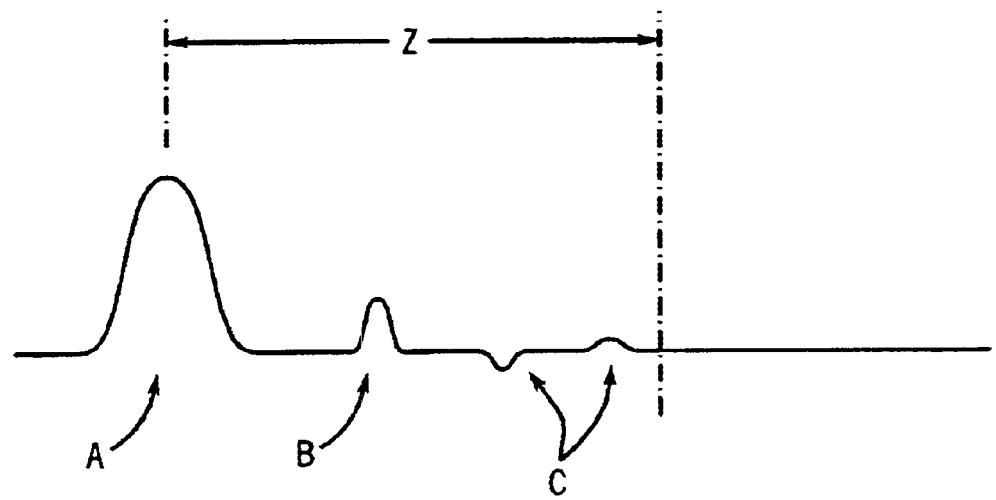
FIG. 11 is a is a timing diagram illustrating a return signal received from the probe of FIG. 10.

Referring to FIG. 10, it is often desirable to install a single conductor probe 100 into a tank 130 through a nozzle 132. A nozzle is a section of pipe that is short compared to the probe length. Nozzle inside diameters typically range from two inches to eight inches. Since a single conductor probe easily senses to these distances and most nozzles are made of electrically conductive materials, the probe senses the nozzle and produces a response to it. The geometry consisting of a single conductor probe inserted in the center of a nozzle is the same as the geometry of an air dielectric coaxial cable. Therefore, such an arrangement has an impedance, which depends on the ratio of the nozzle inside diameter to the probe diameter. Typical impedances may range from 75 Ohms to 200 Ohms or more. The result is that the electromagnetic pulse sees two impedance changes. In FIG. 11, impedance step A is at the transition from a coaxial feed cable 134 to the top of the nozzle and impedance step B is at the transition from the bottom of the nozzle to the single conductor transmission line 104 in the tank. These two impedance steps produce two direct echoes as well as additional multiple echoes, represented by impedance steps C in FIG. 11, due to reverberation between the impedance steps. These reverberation echoes can interfere with the detection of the desired level echo. Such interference can prevent the level detection system from properly identifying the echo from the material level, resulting in a false level indication.

Figure 12:
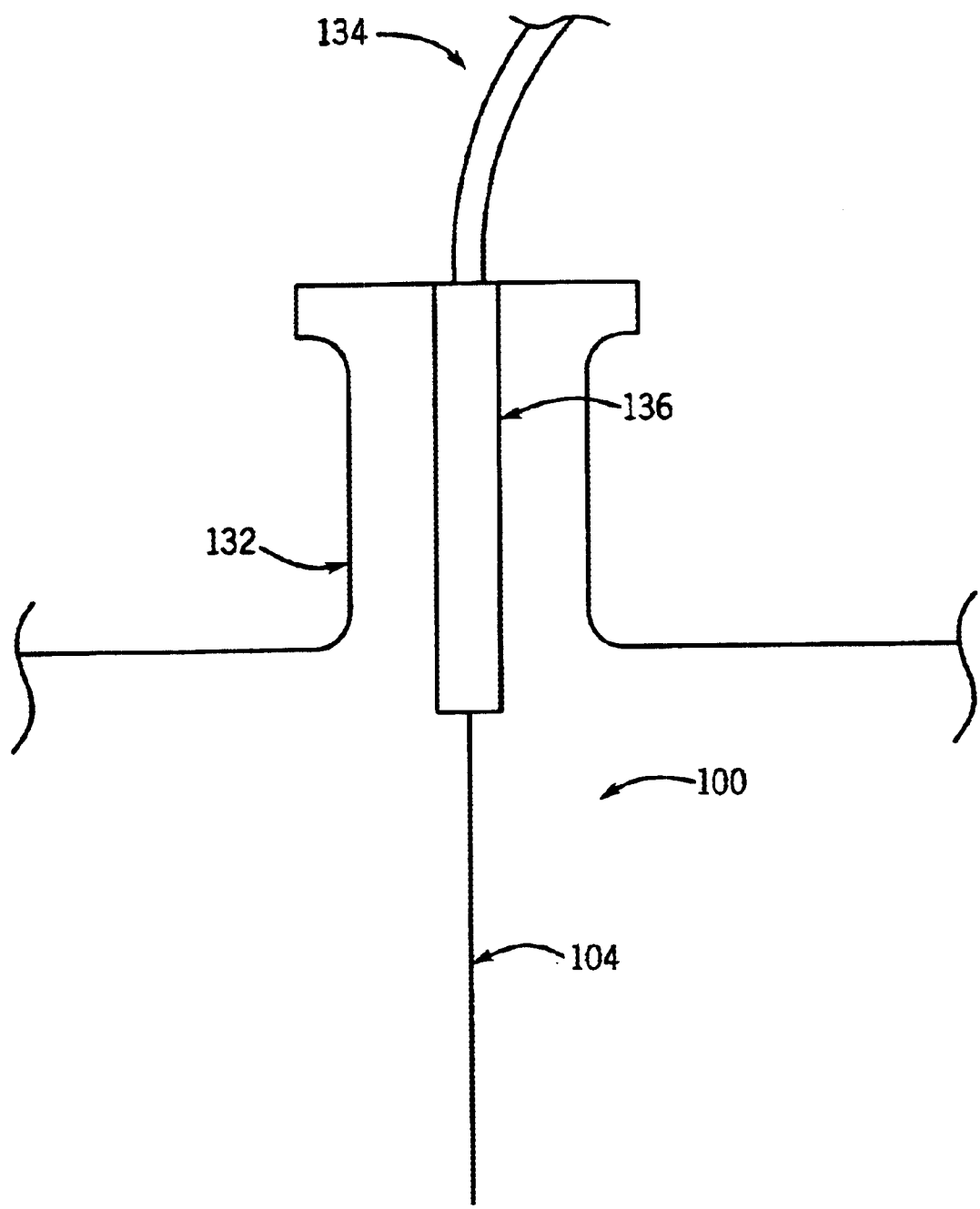
FIG. 12 is a side elevation view of the probe of FIG. 10 including a coaxial extension in accordance with the invention.

In accordance with another aspect of the invention, the single conductor probe 100 confines the electromagnetic fields inside a coaxial extension 136 or other structure in the probe 100 until after the probe exits the nozzle, as in FIG. 12. In effect, this extension 136 becomes an extension of the coaxial feed line 134 to the conductor 104. The extension 136 is designed to have the same impedance as the feed line 134, so that the transition from the feed line 134 to the extension 136 does not generate any signal reflections. The transition from the extension 136 to the single conductor transmission line 104 occurs below the nozzle 132, so that the electromagnetic fields on the single conductor probe 100 do not see the nozzle 132. The effect is the same as would result if the probe 100 had been installed below the nozzle 132. Such a single conductor probe 100 is called a nozzle probe because it can be installed in a nozzle without seeing the impedance changes and undesired echoes that would otherwise be caused by the nozzle. It is, however, insensitive to material levels above the bottom of the nozzle where the extension confines the electromagnetic fields to the interior of the probe.

An alternative for operating in nozzles is to design the signal processing electronics in such a way that it ignores all level echoes received from the top length of a probe. This results in a deadzone Z at the top of the probe where all level echoes are ignored. See FIG. 11. The deadzone Z must be variable in length and must be adjusted to at least the length of the nozzle 132 so that the unwanted echoes from the impedance changes caused by the nozzle 132 are gated out and are not mistaken as echoes from the material level. In the case of nozzles that are long compared to their diameter, the transmitted pulse and its echoes will reverberate inside the nozzle several times before decaying to negligible amplitude. This reverberation will require that the length of the deadzone Z is set to a distance of two or more times the length of the nozzle. The level measuring system is insensitive to material levels inside the deadzone Z.

Figure 13:
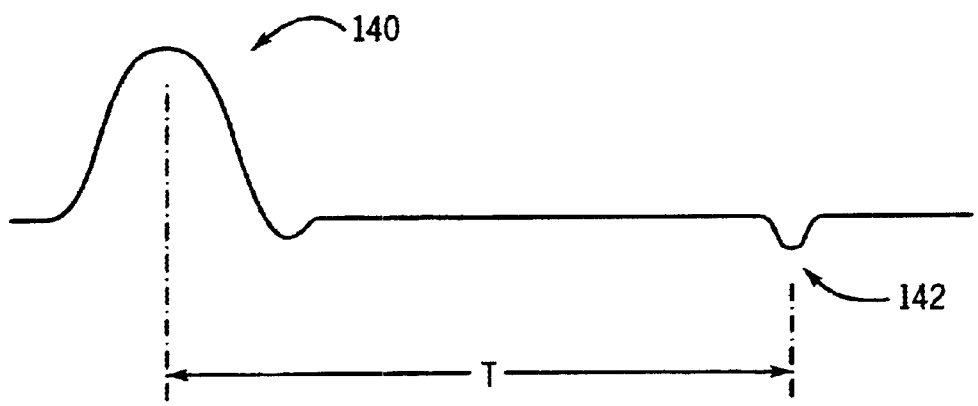
FIG. 13 is a timing diagram illustrating a return signal received from a probe with fixed gain.

The echo generated by the unavoidable top of probe echo 140, see FIG. 13, can be used as a reference, or fiducial signal. The distance to a material level echo 142 can be determined by measuring the time difference T between the reception of the top of probe echo 140 and the reception of the level echo 142. This time difference is just the round trip travel time of the electromagnetic pulse on the single conductor probe, and is proportional to the distance from the top of the probe to the material level. An alternative is to measure the round trip travel time of the level echo relative to the time when the transmitted pulse is generated. However, many error sources exist that can change the apparent time between the transmission of a pulse and the reception of an echo, including changes in the path length or speed of propagation with temperature in interconnecting cables, and offset and offset drift in the measurement electronics. The technique of measuring the time of the level echo relative to the time of the top of probe echo cancels out many of these error sources, resulting in a more accurate measurement and/or lower cost and lower power measurement electronics.

The amplitude of the fiducial pulse 140 from the top of the probe is usually large compared to the amplitude of the echo pulse 142 from the material level. This is because the large impedance change at the transition from the feed line to the single conductor transmission line reflects most of the energy back to the electronics. Any fixed amplification factor in the signal processing electronics will be inappropriate for either the large fiducial signal or the small level echo signal. As shown in FIG. 13, if the amplification factor is set appropriately for the large fiducial signal, the small level echo signal may be too small to accurately process. If the amplification factor is set appropriately for the small level signal, the fiducial signal will saturate the signal amplifiers, thereby preventing the accurate measurement of the timing information.

Figure 14:
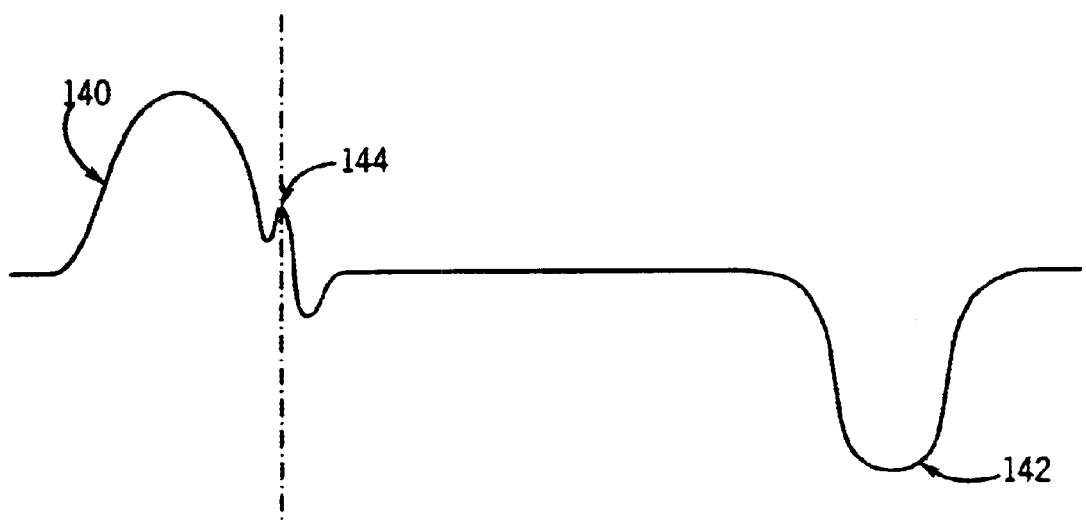
FIG. 14 is a timing diagram illustrating a return signal received from a probe using controlled gain in accordance with the invention.
Figure 15:
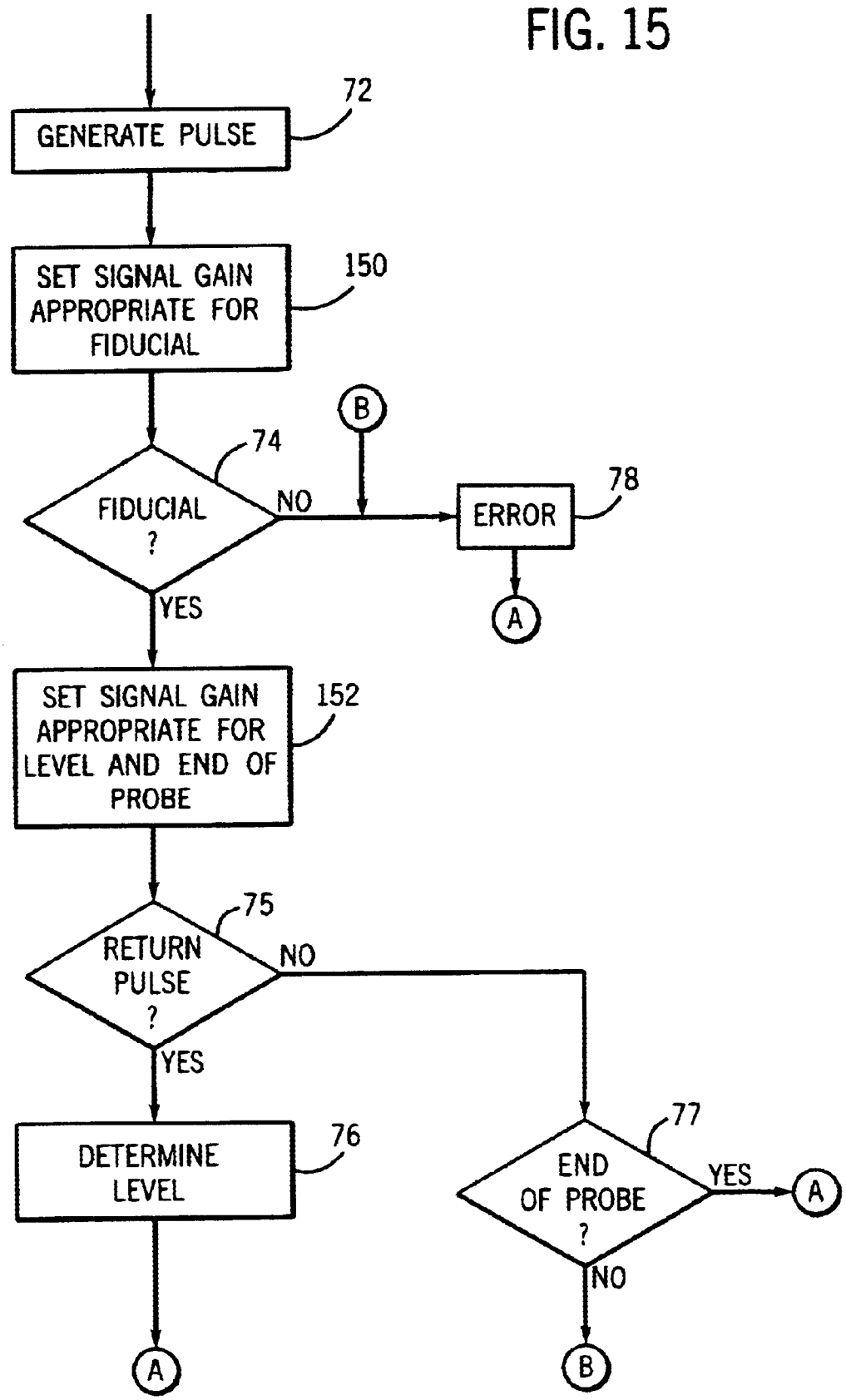
FIG. 15 is a flow diagram illustrating an expanded measurement routine for controlling gain.

In accordance with a further aspect of the invention, the amplification factor is controlled by software in the microprocessor 32 of FIG. 2. At the start of each measurement cycle, the software sets the amplification factor to a value that is optimal for extracting the timing information from the fiducial pulse. Once the timing information has been extracted from the fiducial pulse, then the software increases the amplification factor to a higher value which is optimal for extracting the timing information from the much smaller level echo pulse. At the end of a measurement cycle the amplification factor is returned to the first value in preparation for another measurement cycle. In this way, the signal gain is changed during a measurement cycle under software control to optimize the overall measurement process. This gain change is shown in FIG. 14 at 144. Referring to FIG. 15, a flow diagram illustrates operation of software for gain control. This flow diagram is an expansion of the routine of FIG. 4 beginning at the block 72. The flow diagram uses like reference numerals for the processing steps that are unchanged.

The modified level measurement routine begins at the block 72, where a pulse is generated. As above, the generation of the pulse actually consists of a repetitive pulse sequence using the ETS and MIR technologies. The signal gain is set for the fiducial pulse 140 at a block 150. The decision block 74 determines if there has been a fiducial pulse, as shown in FIG. 14. If the fiducial pulse is received, then a block 152 reduces the gain to a level appropriate for level measurement and the end of the probe. The decision block 75 determines if a return level pulse is received within the ROI after the fiducial. If so, then the block 76 determines level. This is done by measuring the time between the fiducial marker at the beginning of the ROI and the reflection from the media. The time is multiplied by the conversion factor and added to the scale offset to obtain the distance from the top of the probe to an interface of dissimilar materials. The level is the probe length minus the distance plus an offset, which is the distance from the end of the probe to a predetermined reference point. The routine then returns to the decision block 70, see FIG. 4. The level measurement routine is repeated unless the user has changed a parameter, in which event the setup routine is repeated.

If a return pulse is not received, as determined at the decision block 75, then a self diagnostic routine is entered. Particularly, an expected time of flight is known between the fiducial and the end of probe. If no signal is received within that time, then the instrument 20 is not operating properly. The decision block 77 determines if an end of probe signal is detected within the expected time limit. If so, then the control returns to the decision block 70 and the level measurement routine is repeated unless the user has changed a parameter, in which event the setup routine is repeated.

If the fiducial signal or, in the absence of a level pulse, the end of probe signal is missing, an error condition is indicated at the block 78. An error message is given at display interface 36 and the current on two-wire line 42 is at an error level, e.g., less than 4 mA or more than 20 mA. The control returns to block 70, as described above.

Figure 16:
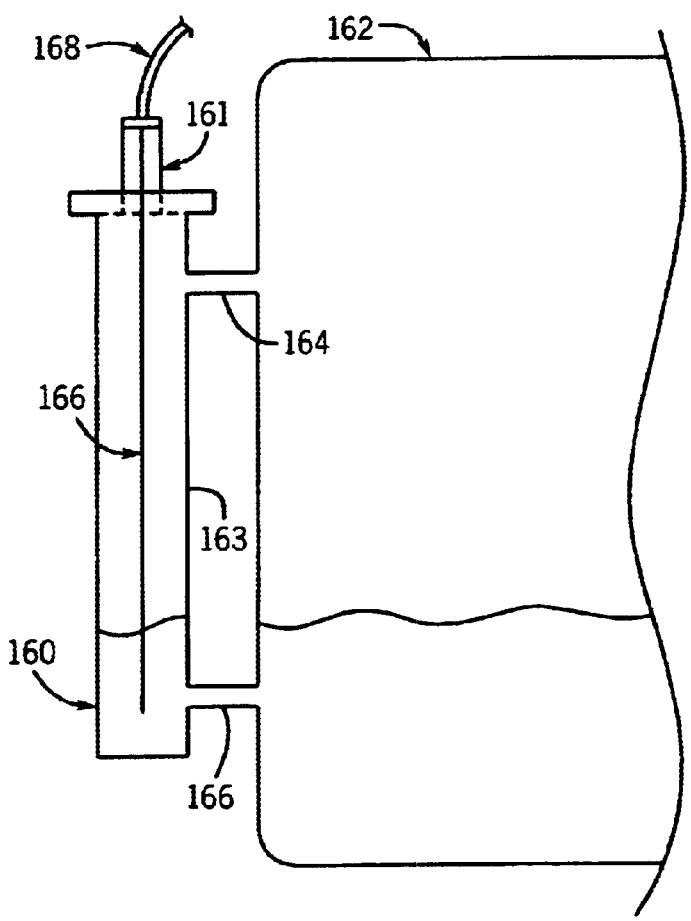
FIG. 16 is a side elevation view of a cage including a single rod probe.

It is often desirable to install a single conductor probe into an electrically conductive cage 160, see FIG. 16. The cage 160 has a pipe or similar device 163 external to a tank 162. The cage has a narrow neck 161. The cage 160 is usually mounted vertically and which is usually connected to the tank through two or more horizontal pipes 164 and 166, one of which is near the bottom of the vertical pipe 163 and one of which is near the top of the pipe 163. The arrangement allows the material level in the pipe 163 to equalize with the material level in the tank 162, while largely isolating the interior of the pipe 163 from agitation, mixing, and other activities taking place in the tank 162.

Figure 17:
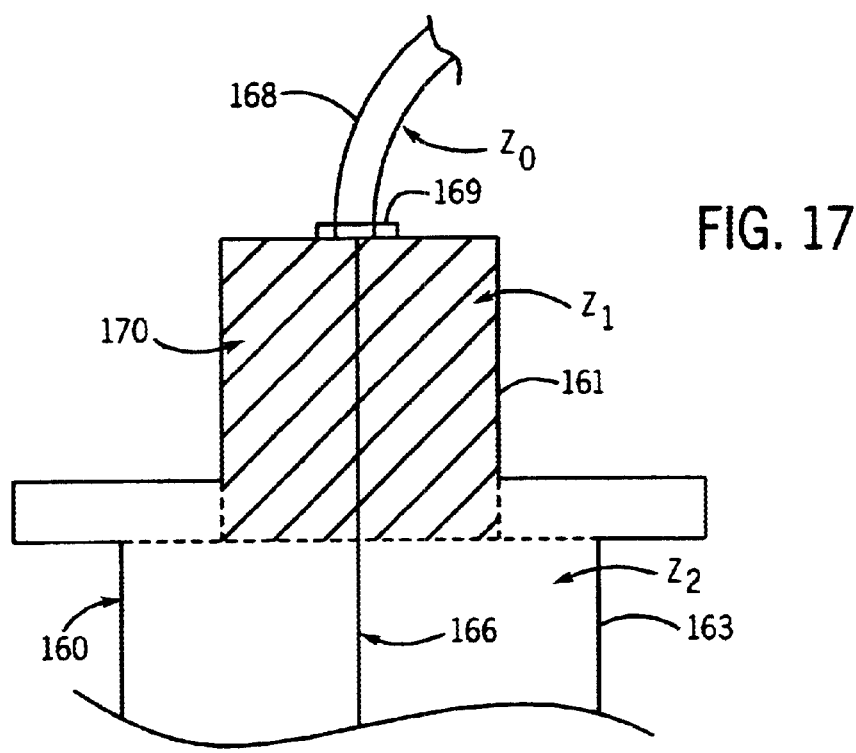
FIG. 17 is an enlarged view of a top of the cage of FIG. 16 illustrating connection of a cable to the probe.

Installing a single conductor probe 166 into an electrically conductive cage 160 forms a coaxial transmission line where the probe forms the inner conductor and the interior surface of the cage becomes the outer conductor of the coaxial transmission line. Like all coaxial transmission lines, such a physical arrangement has a characteristic impedance which is dependent on the ratio of the outer diameter of the inner conductor to the inner diameter of the outer conductor and on the dielectric constant of the material between the two conductors. Such a coaxial arrangement has an impedance change (usually an impedance rise) at the transition from the coaxial feed cable 168 to the probe/cage combination at a connector 169. In FIG. 17, an impedance $Z_1$ of a filler material 170 in the neck 161 is greater than impedance $Z_0$ of the cable 168. This impedance rise reflects some of the energy in the transmitted pulse back to the transmitter. This reflected energy can be sensed and used as a timing reference. The top of the probe can be designed in the form of a coaxial cable with appropriate dimensions and a filler material of appropriate dielectric constant, for example, Teflon, such that there is no impedance change and therefore no signal reflection at the interface between the top of the probe and the top of the cage. In FIG. 17, $Z_1$ equals impedance $Z_2$ of the probe 166 in a gaseous environment. With this physical arrangement, the reference pulse occurs at the beginning of the region containing the filler material 170 rather that at the top of the pipe 163. The positive reference signal and the negative level signal are always separated in space and therefore in time. This prevents the partial overlap and cancellation, even when material fills the cage to the top. The difference in the time of arrival of the reference pulse and the signal pulse can be measured and converted into the distance from the top of the cage to the level.

Thus, in accordance with the invention, there is described a TDR measurement instrument which includes automatic compensation for the dielectric constant of a gas, and uses a single conductor probe.

We claim:

1. A time domain reflectometry measurement instrument comprising:

a probe defining a transmission line;

a pulse circuit connected to the probe for generating pulses on the transmission line and receiving reflected pulses returned on the transmission line, the reflected pulses representing a characteristic of a material being measured; and a measuring circuit connected to the pulse circuit for developing a representation of the reflected pulses, the measuring circuit automatically adjusting sampling responsive to variation in dielectric constant of material being traversed by the transmission line.

2. The time domain reflectometry measurement instrument of claim 1 wherein the measuring circuit multiplies a return pulse time by a conversion factor, the conversion factor being selectively modified responsive to variation in dielectric constant of material being traversed by the transmission line.

3. The time domain reflectometry measurement instrument of claim 2 wherein the measuring circuit measures a time difference between two markers on the probe, the two markers being a select distance apart, and the conversion factor is modified to correct for reduced propagation velocity caused by dielectric constant of material being traversed by the transmission line.

4. The time domain reflectometry measurement instrument of claim 1 wherein the measuring circuit comprises an equivalent time sampling circuit to sample reflected pulses to build a time multiplied picture of the reflected pulses.

5. The time domain reflectometry measurement instrument of claim 1 wherein the pulse circuit comprises a microimpulse radar circuit.

6. The time domain reflectometry measurement instrument of claim 1 wherein the probe comprises a guided wave radar probe.

7. A time domain reflectometry measurement instrument comprising:

a probe defining a guided wave radar transmission line;

a pulse circuit connected to the probe for generating a stream of pulses on the transmission line and receiving reflected pulses returned on the transmission line, the reflected pulses representing a characteristic of a material being measured;

an equivalent time sampling circuit connected to the pulse circuit to sample reflected pulses to build a time multiplied picture of the reflected pulses; and a measuring circuit connected to the equivalent time sampling circuit for measuring round trip travel time for a pulse from the pulse circuit, the measuring circuit to automatically adjust travel time responsive to variation in dielectric constant of material being traversed by the transmission line.

8. The time domain reflectometry measurement instrument of claim 7 wherein the measuring circuit multiplies a return pulse time by a conversion factor, the conversion factor being selectively modified responsive to variation in dielectric constant of material being traversed by the transmission line.

9. The time domain reflectometry measurement instrument of claim 8 wherein the measuring circuit measures a time difference between two markers on the probe, the two markers being a select distance apart, and the conversion factor is modified to correct for reduced propagation velocity caused by dielectric constant of material being traversed by the transmission line.

10. The time domain reflectometry measurement instrument of claim 7 wherein the pulse circuit comprises a microimpulse radar circuit.

11. A guided wave radar sensor comprising:

a single conductor probe defining a transmission line;

a pulse circuit connected to the probe for generating pulses on the transmission line and receiving a sampled return signal including representations of reflected pulses returned on the transmission line, the reflected pulses representing a characteristic of a material being measured; and a measuring circuit connected to the pulse circuit for detecting the reflected pulses, the measuring circuit including a comparator receiving the sampled return signal and a decaying threshold signal to determine if amplitude of the sampled return signal exceeds amplitude of the threshold.

12. The guided wave radar sensor of claim 11 wherein the threshold signal decays with time corresponding to a rate that the sampled returned signal decays with distance down the single conductor probe.

13. The guided wave radar sensor of claim 11 further comprising a zero cross detector detecting a zero crossing of a differentiated version of the sampled return signal and an output of the zero cross detector is combined with an output of the comparator to detect a reflected pulse.

14. A guided wave radar sensor comprising:

a single conductor probe defining a transmission line;

means for mounting the probe to a nozzle of a vessel;

a pulse circuit operatively connected to the probe via a coaxial feed line for generating pulses on the transmission line and receiving a sampled return signal including representations of reflected pulses returned on the transmission line, the reflected pulses representing impedance changes along the transmission line; and means operatively associated with the pulse circuit for eliminating reflected pulses resulting from impedance changes related to the nozzle.

15. The guided wave radar sensor of claim 14 wherein the eliminating means comprises a coaxial extension connected between the feed line and the probe, the coaxial extension having an impedance the same as impedance of the feed line and a length selected so a transition from the extension to the probe is below the nozzle.

16. The guided wave radar sensor of claim 14 wherein the eliminating means comprises a measuring circuit connected to the pulse circuit for developing a representation of the sampled return signal, the measuring circuit adapted to automatically ignore all reflected pulses in a deadzone, the deadzone being at least length of the nozzle.

17. The guided wave radar sensor of claim 16 wherein the deadzone is set to a distance at least twice length of the nozzle to ignore reverberation reflected pulses.

18. A guided wave radar sensor comprising:

a single conductor probe defining a transmission line;

means for mounting the probe to a nozzle of a vessel; and a pulse circuit operatively connected to the probe via a coaxial feed line defining a select impedance for generating pulses on the transmission line and receiving a sampled return signal including representations of reflected pulses returned on the transmission line, the reflected pulses representing impedance changes along the transmission line, wherein the mounting means maintains impedance at the select impedance through the nozzle to eliminate reflected pulses resulting from impedance changes related to the nozzle.

19. The guided wave radar sensor of claim 18 wherein the mounting means comprises a coaxial extension connected between the feed line and the probe, the coaxial extension having an impedance the same as impedance of the feed line and a length selected so a transition from the extension to the probe is below the nozzle.

20. A time domain reflectometry measurement instrument comprising:

a probe defining a transmission line;

a pulse circuit connected to the probe for generating pulses on the transmission line and receiving a sampled return signal including representations of reflected pulses returned on the transmission line, the reflected pulses representing impedance changes at the connection to the probe and along the transmission line; and a measuring circuit connected to the pulse circuit for detecting the reflected pulses, the measuring circuit receiving the sampled return signal and adapted to automatically adjust amplification of the sampled return signal to be at a first select amount for the impedance at the connection to the probe and a second select amount along the transmission line.

21. The time domain reflectometry measurement instrument of claim 20 wherein the first select amount is lower than the second select amount.

22. The time domain reflectometry measurement instrument of claim 21 wherein the measuring circuit normally sets amplification of the sampled return signal to be the first select amount and adjusts amplification of the sampled return signal to be at the second select amount after the reflected pulse representing impedance change at the connection to the probe is received.

23. The time domain reflectometry measurement instrument of claim 22 wherein the measuring circuit detects level based on time difference between the reflected pulse representing impedance change at the connection to the probe and the reflected pulse representing level of a material along the probe.

24. The time domain reflectometry measurement instrument of claim 23 wherein the measuring circuit returns amplification to the first select amount after receiving the reflected pulse representing level of a material along the probe.

25. A time domain reflectometry measurement instrument comprising:

a single conductor probe defining a transmission line;

a pulse circuit connected to the probe for generating pulses on the transmission line and receiving a sampled return signal including representations of reflected pulses returned on the transmission line, the reflected pulses representing impedance changes at the connection to the probe and along the transmission line; and an equivalent time sampling measuring circuit connected to the pulse circuit for detecting the reflected pulses, the measuring circuit receiving the sampled return signal and adapted to automatically adjust amplification of the sampled return signal to be at a first select amount for the impedance at the connection to the probe and a second select amount along the transmission line.

26. The time domain reflectometry measurement instrument of claim 25 wherein the first select amount is lower than the second select amount.

27. The time domain reflectometry measurement instrument of claim 26 wherein the measuring circuit normally sets amplification of the sampled return signal to be the first select amount and adjusts amplification of the sampled return signal to be at the second select amount after the reflected pulse representing impedance change at the connection to the probe is received.

28. The time domain reflectometry measurement instrument of claim 27 wherein the measuring circuit detects level based on time difference between the reflected pulse representing impedance change at the connection to the probe and the reflected pulse representing level of a material along the probe.

29. The time domain reflectometry measurement instrument of claim 28 wherein the measuring circuit returns amplification to the first select amount after receiving the reflected pulse representing level of a material along the probe.

30. In a time domain reflectometry measurement instrument including a pulse circuit for generating pulses on a feed cable and receiving a sampled return signal including representations of reflected pulses returned on the feed cable, the reflected pulses representing impedance changes, an improved probe assembly comprising:

a single conductor probe;

a cage comprising a pipe having a neck, the probe extending through the cage to define a coaxial transmission line and terminating at a connector at the neck for connecting to the feed cable, the neck having a filler material surrounding the probe so that impedance of the transmission line in the neck is substantially equal to impedance of the transmission line in the pipe.

31. The time domain reflectometry measurement instrument of claim 30 wherein the filler material has dimensions and a dielectric constant selected so that there is no impedance change at the neck.

32. A probe assembly for use with a time domain reflectometry measurement instrument including a pulse circuit for generating pulses on a feed cable and receiving a sampled return signal including representations of reflected pulses returned on the feed cable, the reflected pulses representing impedance changes, the probe assembly comprising:

a single conductor probe;

a hollow cage comprising a pipe of a select diameter having a narrow top neck, the probe extending through the cage to define a coaxial transmission line and terminating at a connector at the neck for connecting to the feed cable, the neck having a filler material surrounding the probe so that impedance of the transmission line in the neck is substantially equal to impedance of the transmission line in the pipe.

33. The probe assembly of claim 32 wherein the filler material has dimensions and a dielectric constant selected so that there is no impedance change at the neck.

* * * * *